Patented Dec. 3, 1935

2,023,176

UNITED STATES PATENT OFFICE 2,023,176

DISAZO DYESTUFFS

Hans Krzikalla and Walter Limbacher, Ludwigshafen-on-the-Rhine, Germany, assignors to General Aniline Works, Inc., New York, N. Y., a corporation of Delaware No Drawing. Application October 28, 1933, Serial No. 695,718. In Germany November 12, 1932

7 Claims. (Cl. 260—77)

The present invention relates to new disazo dyestuffs of valuable fastness properties and a process of producing the said dyestuffs.

We have found that valuable disazo dyestuffs are obtained by coupling 1 molecular proportion of a tetrazotized 4,4'-diaminobenzophenone with 2 molecular proportions of the same or different coupling components, 1 molecular proportion of the latter being a compound corresponding to the general formula X—NH—Y—X, wherein one X stands for the radicle of a hydroxynaphthalene, the other X for an aryl or a hydroynaphthalene radicle and wherein Y represents one of the groups —CO— and —SO$_2$—, the other coupling component being either of the same type or any other coupling component, the constituents being so selected that at least one sulphonic acid group is present in the finished dyestuff.

Suitable tetrazo compounds are those obtainable by tetrazotizing 4,4'-diaminobenzophenone itself and its substitution products, as for example its halogen, alkyl, alkoxyl, nitro, sulphonic and carboxylic acid derivatives. Suitable coupling components of the kind defined above are for example 2,3-hydroxynaphthoic acid arylides, hydroxynaphthalenesulpharylides, benzoylaminonaphthols, benzoyl- or phenylsulphoaminonaphthol sulphonic acids or 2,3-hydroxynaphthoic acid arylide sulphonic acids.

In the said manner both symmetrical and asymmetrical disazo dyestuffs can be obtained. Symmetrical disazo dyestuffs of the kind in question are prepared by coupling 1 molecular proportion of a 4,4'-diaminobenzophenone with 2 molecular proportions of a coupling component of the type defined above, asymmetrical disazo dyestuffs by first coupling 1 molecular proportion of a 4,4'-diaminobenzophenone with 1 molecular proportion of a coupling component of the kind defined above, for example a naphthol sulphonic acid containing an aryl radicle attached thereto by means of a —NH—CO— or —NH—SO$_2$— group, and then allowing another coupling component which may or may not be of the type disclosed above, to act on the product. Of course, a coupling component of the special type in question may be used also after 1 molecular proportion of another coupling component has reacted with the 4,4'-diaminobenzophenone.

The dyestuffs obtainable in the manner described yield on wool and silk brilliant dyeings of good fastness to light, those on wool possessing excellent fastness to washing and fulling and those on silk excellent fastness to water.

The following examples will further illustrate the nature of this invention but the invention is not restricted to these examples. The parts are by weight.

Example 1

21.2 parts of 4,4'-diaminobenzophenone are tetrazotized in the usual manner and the resulting tetrazo solution is allowed to flow into a solution, rendered alkaline with soda, of 93 parts of 1-benzoylamino-8-hydroxynaphthalene-3,6-disulphonic acid. When the coupling is completed, the reaction mixture is worked up in the usual manner. A dyestuff is obtained which dyes wool bluish red shades very fast to washing and fulling and which yields on silk brilliant bluish red dyeings fast to water.

Example 2

21.2 parts of 4,4'-diaminobenzophenone are tetrazotized in the usual manner and the resulting tetrazo solution is allowed to flow into a solution of 75.4 parts of 2-benzoylamino-5-hydroxynaphthalene-7-sulphonic acid which has been rendered alkaline with sodium carbonate. A dyestuff is obtained which dyes wool and silk yellow-red shades of very good properties as regards fastness.

Example 3

21.2 parts of 4,4'-diaminobenzophenone are tetrazotized in the usual manner and the resulting tetrazo solution is allowed to flow into a solution of 42.3 parts of 1-benzoylamino-8-hydroxynaphthalene-4,6-disulphonic acid which has been rendered alkaline with sodium carbonate. As soon as the coupling of one diazo group with the said coupling component is completed, an aqueous alkaline solution of 15.1 parts of beta-naphthol is added. The resulting dyestuff is salted out, filtered by suction and dried. It yields on wool and silk blue-red dyeings very fast to light and having very good fastness to washing and fulling or to water.

Example 4

The tetrazo solution obtained by the tetrazotization of 21.2 parts of 4,4'-diaminobenzophenone is added to a solution of 49.2 parts of 1-(2',5'-dichlorbenzoylamino)-8-hydroxynaphthalene-4,6-disulphonic acid which has been rendered alkaline with sodium carbonate. As soon as coupling is completed an aqueous alkaline solution of 24.6 parts of 2-hydroxy-6-sulphonic acid is added.

A dyestuff is obtained which yields fast red dyeings on wool and silk.

*Example 5*

27.2 parts of 3,3'-dimethoxy-4,4'-diaminobenzophenone are tetrazotized in the usual manner and the tetrazo solution obtained is allowed to flow into a solution of 93 parts of 1-benzoylamino-8-hydroxynaphthalene-4,6-disulphonic acid rendered alkaline with sodium carbonate. As soon as coupling is completed the reaction mass is worked up as usual and a dyestuff is obtained yielding fast violet dyeings on wool and silk.

*Example 6*

27.2 parts of 3,3'-dimethoxy-4,4'-diaminobenzophenone are terazotized and the resulting solution is allowed to flow into a solution of 34.3 parts of 2-benzoylamino-8-hydroxynaphthalene-6-sulphonic acid which has been rendered alkaline with sodium carbonate. As soon as coupling of the said coupling compound is completed, an aqueous alkaline solution of 54.1 parts of 1-(2',5'-dichlorbenzoylamino)-8-hydroxynaphthalene-4,6-disulphonic acid is added. The resulting dyestuff yields on wool and silk blue-violet dyeings very fast to light and having very good fastness to washing and fulling or to water.

*Example 7*

28.1 parts of 3,3'-dichlor-4,4'-diaminobenzophenone are tetrazotized and the resulting tetrazo solution is added to a solution of 47.3 parts of 1-(para-toluenesulphamino)-8-hydroxynaphthalene-3,6-disulphonic acid which has been rendered alkaline with sodium carbonate. As soon as coupling of the said coupling component is completed, an aqueous alkaline solution of 26.2 parts of 2-amino-8-hydroxynaphthalene-6-sulphonic acid is added. The resulting dyestuff yields red dyeings on wool and silk.

*Example 8*

21.2 parts of 4,4'-diaminobenzophenone are tetrazotized in the usual manner and the solution of the tetrazo compound obtained is allowed to flow into a solution (rendered alkaline with sodium carbonate) of 75.4 parts of 2,3-hydroxynaphthoic acid anilide sulphonated by treatment with sulphuric acid. After coupling is completed, the reaction product is worked up as usual. The dyestuff obtained dyes wool yellow-red shades and silk brillant yellow-red shades of good fastness to water.

*Example 9*

21.2 parts of 4,4'-diaminobenzophenone are tetrazotized in the usual manner and the solution obtained is added to an aqueous solution of 42.3 parts of 1-benzoylamino-8-hydroxy-naphthalene-3,6-disulphonic acid, rendered alkaline with sodium carbonate. As soon as coupling is practically completed an alkaline aqueous solution of 31.3 parts of 2-naphthol-6-sulphanilide is added to the mass. The dyestuff formed dyes wool and silk red shades.

What we claim is:—

1. The process of producing disazo dyestuffs which comprises coupling 1 molecular proportion of a tetrazotized 4,4'-diaminobenzophenone with 2 molecular proportions of coupling material, 1 molecular proportion at least thereof being a compound corresponding to the general formula X—NH—Y—X (wherein one X stands for the radicle of a hydroxynaphthalene, the other X for an aryl radicle or the radicle of a hydroxynaphthalene and wherein Y represents one of the groups —CO— and —SO$_2$—), the components being so selected that the finished dyestuff contains at least one sulphonic acid group.

2. Disazo dyestuffs corresponding to the general formula

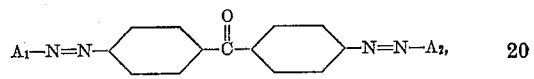

wherein A$_1$ is the radicle of a compound corresponding to the general formula X—NH—Y—X (wherein one X stands for the radicle of a hydroxynaphthalene, the other X for an aryl radicle or the radicle of a hydroxynaphthalene and wherein Y represents one of the groups —CO— and —SO$_2$—) and wherein A$_2$ is the radicle of any compound capable of coupling, the said dyestuffs containing at least one sulphonic acid group.

3. Disazo dyestuffs corresponding to the general formula

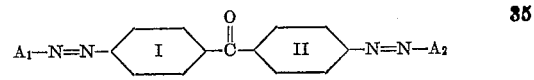

wherein A$_1$ is the radicle of a compound corresponding to the general formula X—NH—Y—X (wherein one X stands for the radicle of a hydroxynaphthalene, the other X for an aryl radicle or the radicle of a hydroxynaphthalene and wherein Y represents one of the groups —CO— and —SO$_2$—), wherein A$_2$ is the radicle of any compound capable of coupling, and wherein the phenylene nuclei marked I and II may be substituted by at least one of the substituents halogen, alkyl, alkoxyl, nitro, sulfonic and carboxyl acid groups, the said dyestuff containing at least one sulfonic acid group.

4. Disazo dyestuffs corresponding to the general formula

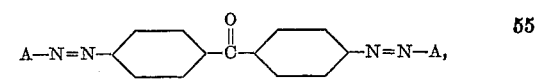

wherein each A is the radicle of a compound corresponding to the general formula X—NH—Y—X (wherein one X stands for the radicle of a hydroxynaphthalene, the other X for an aryl radicle or the radicle of a hydroxynaphthalene and wherein Y represents one of the groups —CO— and —SO$_2$—), the said dyestuffs containing at least one sulphonic acid group.

5. The disazo dyestuff corresponding to the formula

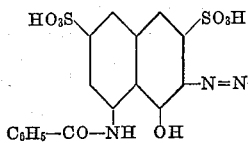
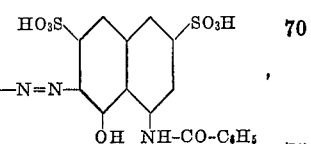

the said dyestuff dyeing wool bluish-red shades very fast to washing and fulling and dyeing silk brilliant bluish red shades fast to water.

6. The disazo dyestuff corresponding to the formula

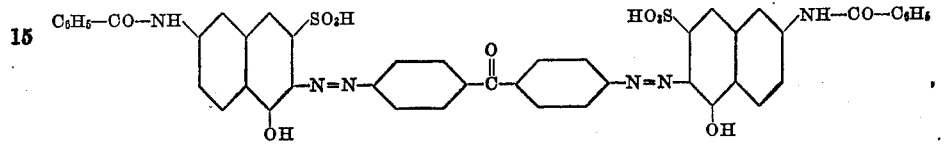

the said dyestuff dyeing wool and silk very fast yellow-red shades.

7. The disazo dyestuff corresponding to the formula

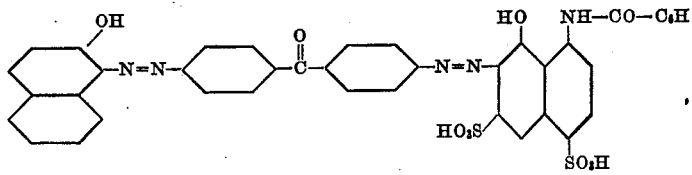

the said dyestuff dyeing wool and silk blue-red shades very fast to light, the dyeings on wool having very good fastness to washing and fulling and those on silk having very good fastness to water.

HANS KRZIKALLA.
WALTER LIMBACHER.